Dec. 28, 1965 J. H. COLLER 3,225,393
PANEL STRUCTURE
Filed April 10, 1963 8 Sheets-Sheet 1

INVENTOR.
JOHN H. COLLER
BY Albert M. Herzig
ATTORNEY.

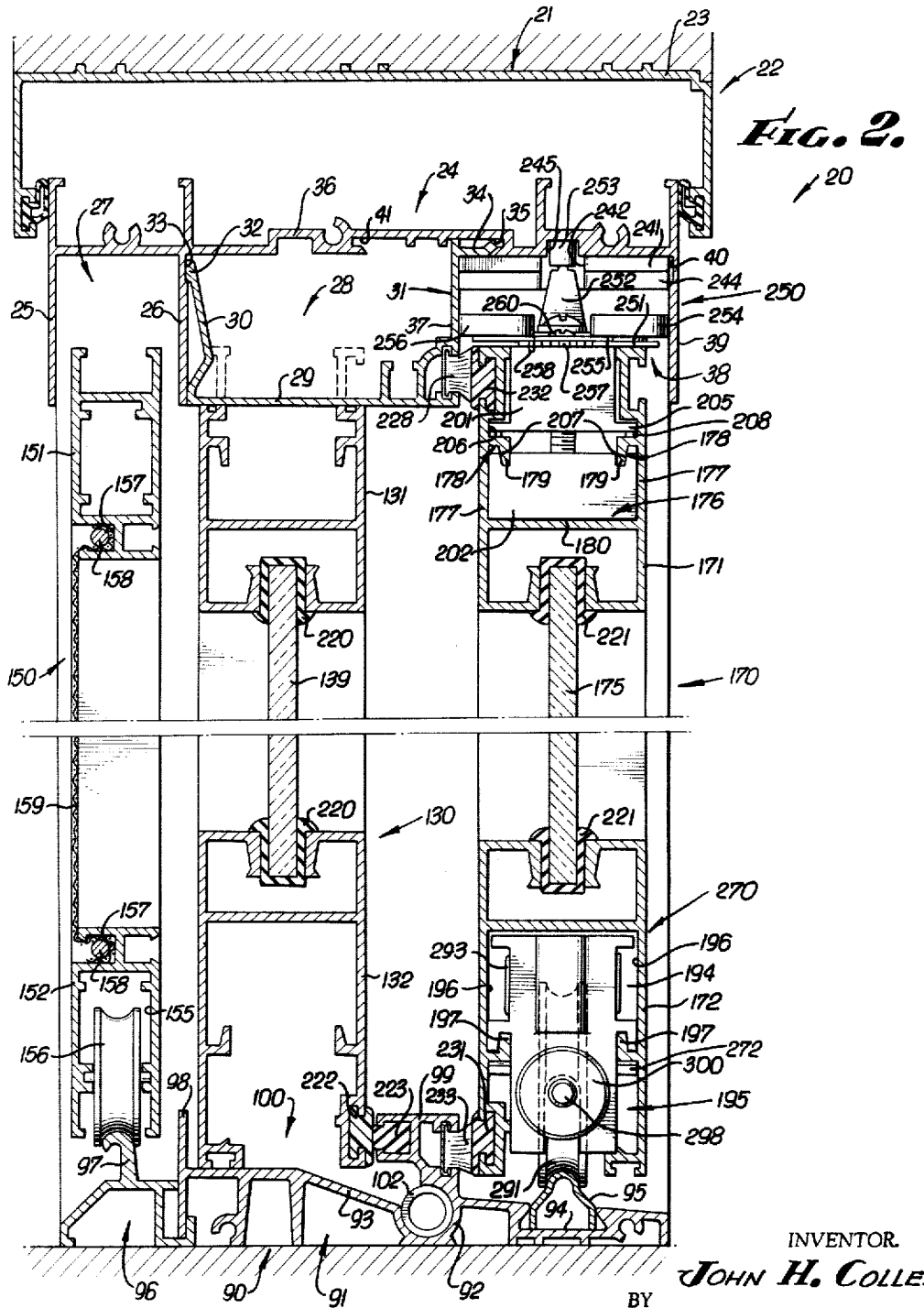

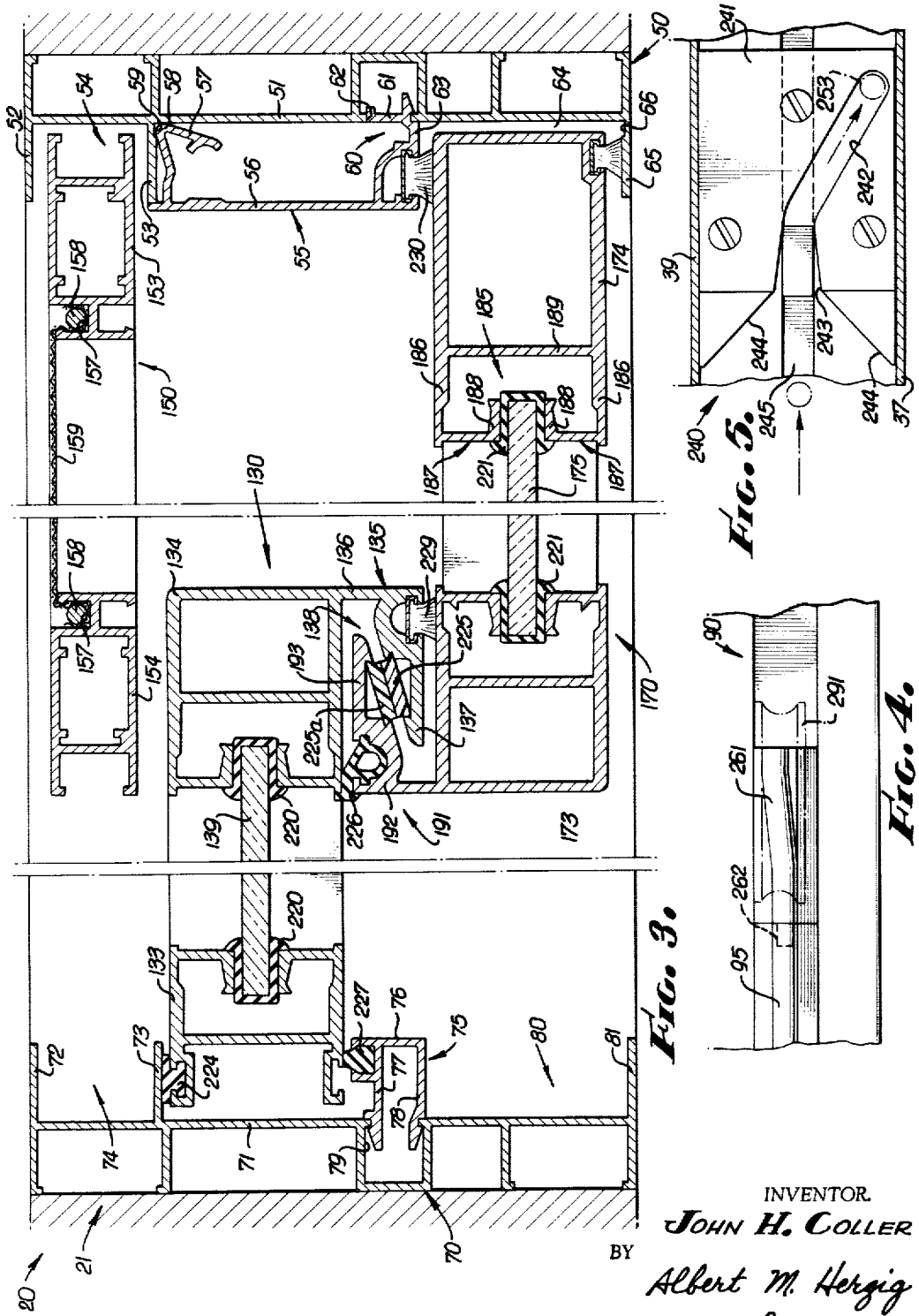

Dec. 28, 1965  J. H. COLLER  3,225,393
PANEL STRUCTURE
Filed April 10, 1963  8 Sheets-Sheet 4

INVENTOR.
JOHN H. COLLER
BY
Albert M. Herzig
ATTORNEY.

Dec. 28, 1965  J. H. COLLER  3,225,393
PANEL STRUCTURE
Filed April 10, 1963  8 Sheets-Sheet 5
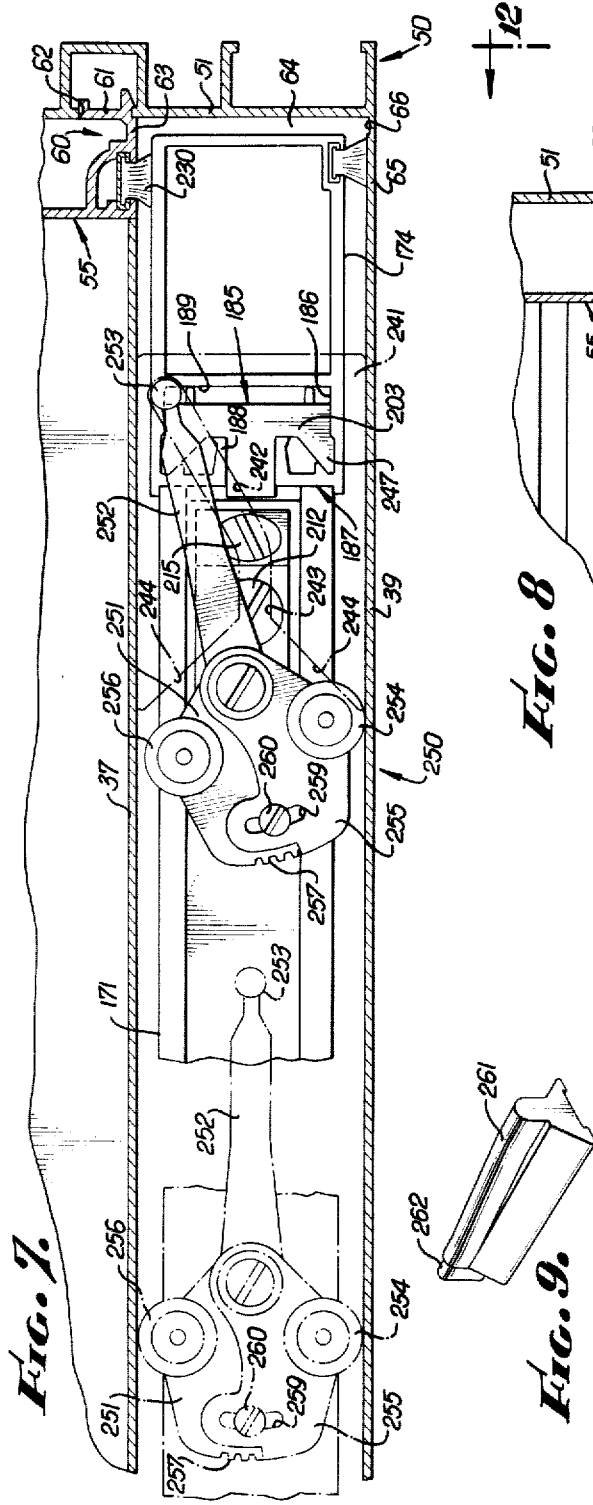
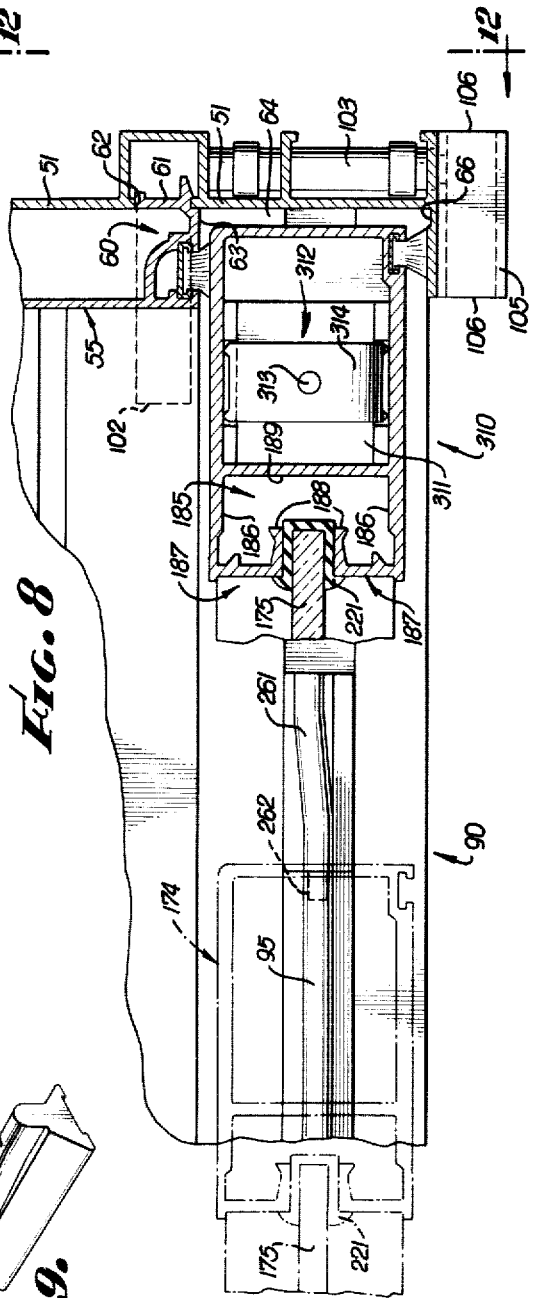
INVENTOR.
JOHN H. COLLER
BY Albert M. Herzig
ATTORNEY.

Dec. 28, 1965   J. H. COLLER   3,225,393
PANEL STRUCTURE
Filed April 10, 1963   8 Sheets-Sheet 6
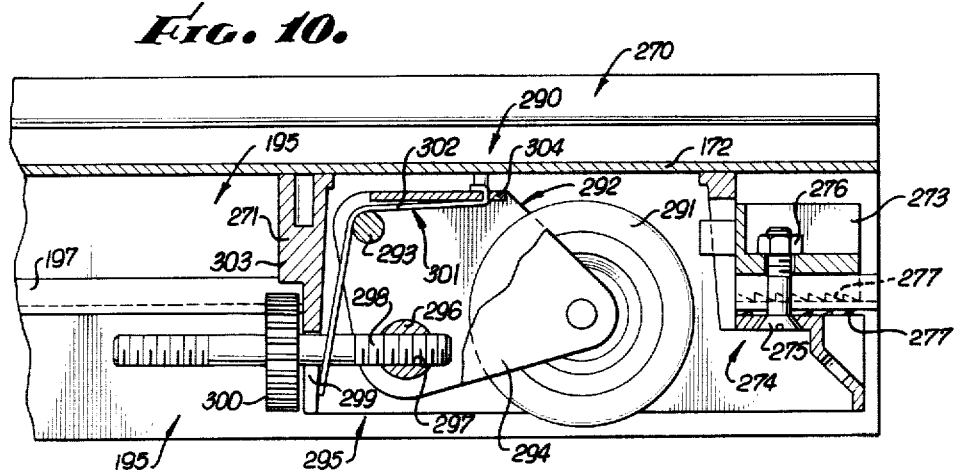
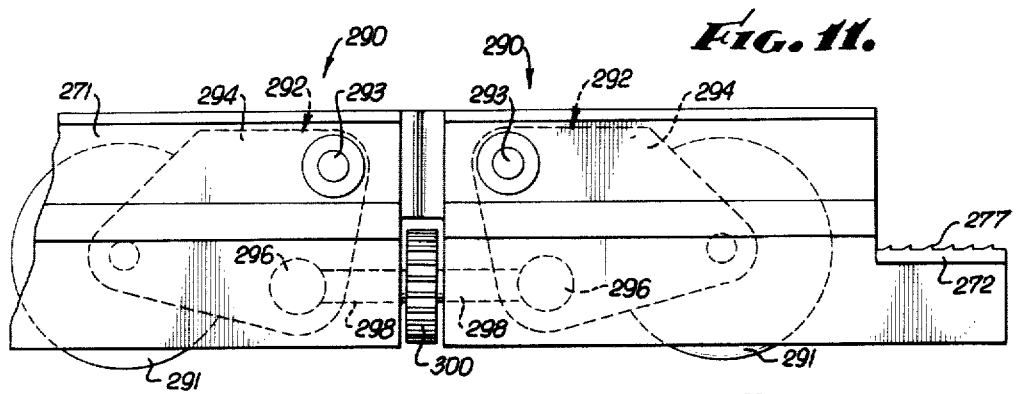
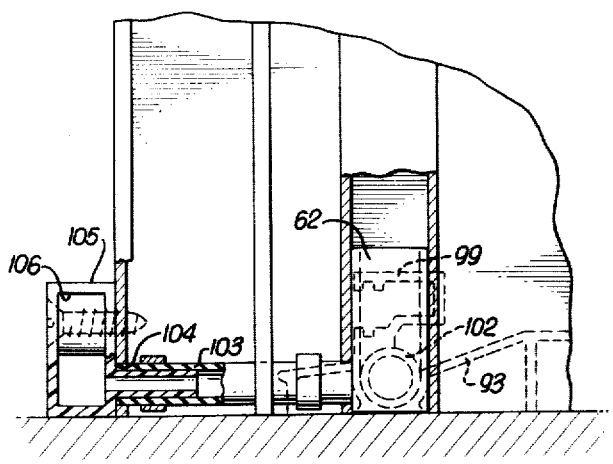
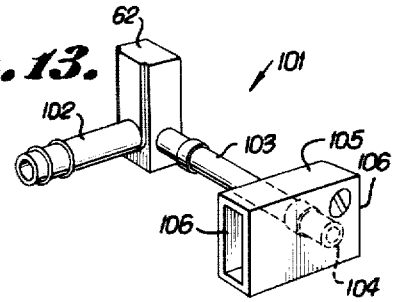
INVENTOR.
JOHN H. COLLER
BY
Albert M. Herzig
ATTORNEY.

Dec. 28, 1965   J. H. COLLER   3,225,393
PANEL STRUCTURE
Filed April 10, 1963   8 Sheets-Sheet 7
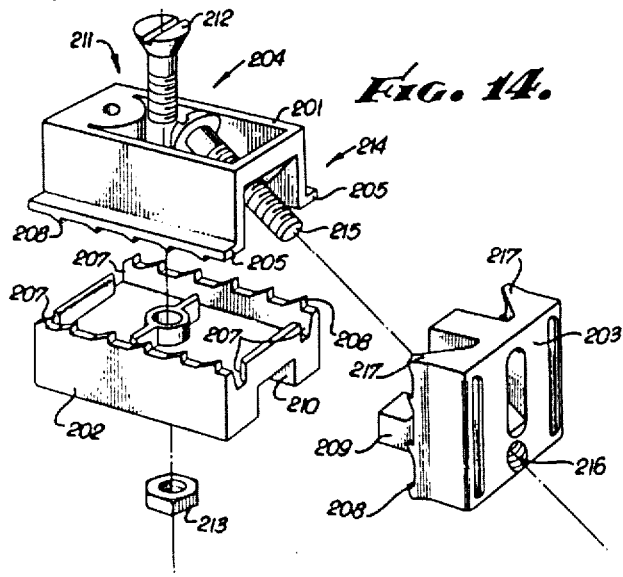
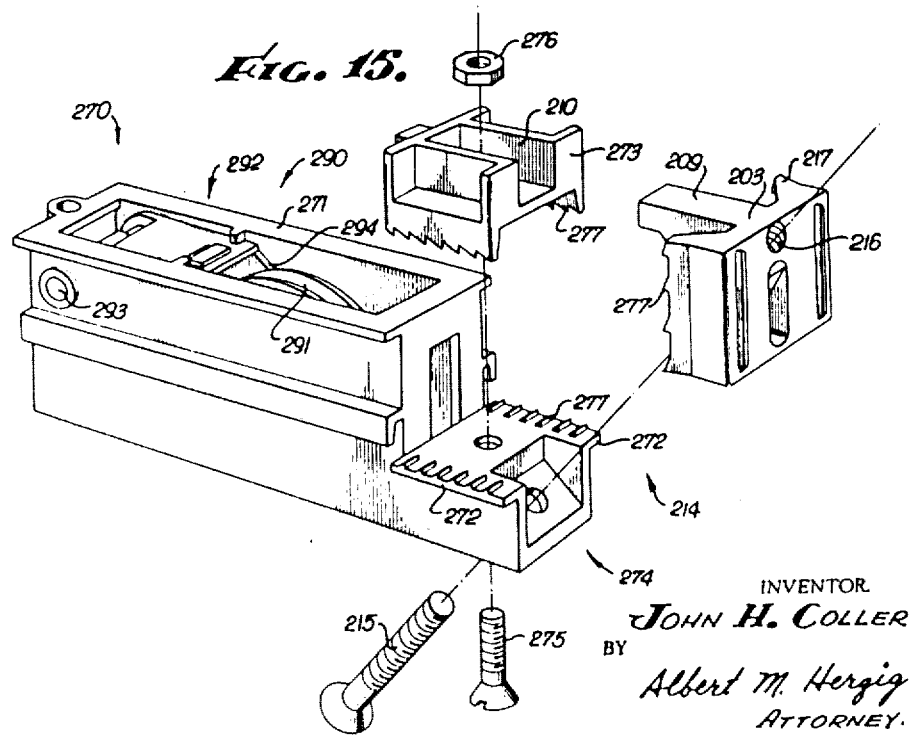
INVENTOR.
JOHN H. COLLER
BY
Albert M. Herzig
ATTORNEY.

Dec. 28, 1965    J. H. COLLER    3,225,393
PANEL STRUCTURE
Filed April 10, 1963    8 Sheets-Sheet 8
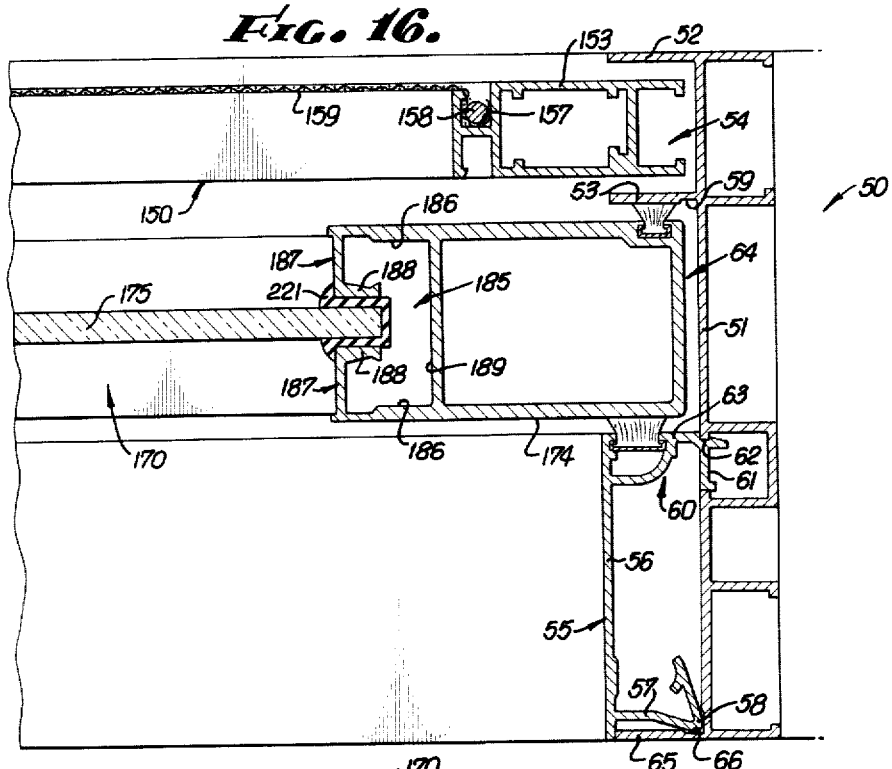
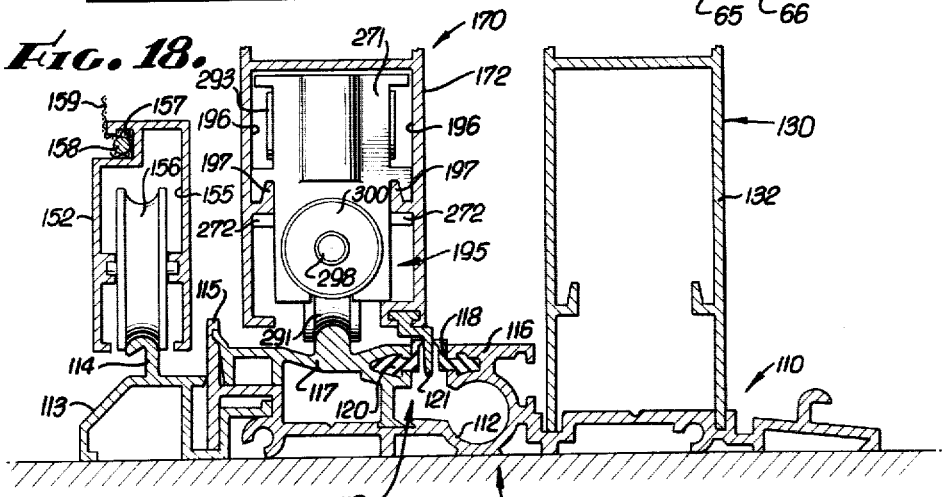
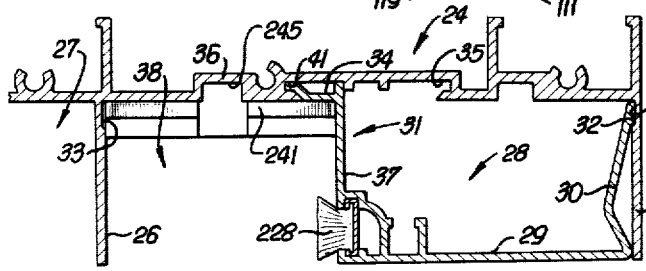
INVENTOR.
JOHN H. COLLER
BY
Albert M. Herzig
ATTORNEY.

United States Patent Office 3,225,393
Patented Dec. 28, 1965

3,225,393
PANEL STRUCTURE
John Harold Coller, Covina, Calif., assignor to Fuller-Trimview, a Division of Texas Aluminum Company, Inc., Covina, Calif., a corporation of California
Filed Apr. 10, 1963, Ser. No. 271,941
5 Claims. (Cl. 20—19)

In general, the present invention relates to a panel structure adapted to be utilized in a wide variety of applications, such as windows, doors and room dividers. More particularly, the present invention involves an easily assembled panel structure which may be economically produced and installed with a minimum expenditure of labor and without requiring expensive tools. As set forth below, the present invention may include an outer fixed frame having an inner frame slidably mounted therein. Each of such frames includes vertical and horizontal members and for convenience of description, such members have been labeled as follows:

Fixed outer frame:
    Upper horizontal member—header
    Lower horizontal member—sill
    Vertical member—jamb
Inner movable frame:
    Upper horizontal member—top rail
    Lower horizontal member—bottom rail
    Vertical member—stile Such labels, however, are only for convenience of description in the specification. Consequently, when used in applicant's claims, they are being used in their broad sense. For example, rail and stile refer to any pair of beams connected at any angle in any frame structure in applicant's claims.

There are available on the market a wide variety of panel structures, such as aluminum sliding glass doors, to be used in the home. However, such panel structures have various defects. For example, the frames for such panels normally employ joint connections which require special notching, hole punching and milling operation in the plant making the frame. Such operations are expensive because of the labor and special expensive tooling required. Moreover, the resulting joint usually must be formed at the ends of the frame portion and exhibit a non-uniform surface, e.g., rivet heads or screw heads show up. Also, in order to assemble such frames, access must be available to the assembler from several surfaces so that the resulting frame when assembled shows the various means utilized in assembling the door and does not present a clean, uniform surface. Furthermore, particularly with extruded metal frames, the ends of the door usually present an open surface which cannot be capped without requiring special working of the door ends or resulting in a bump adjacent the end of the door frame.

Another disadvantage of the prior art panel structures is that where a moving panel is utilized it is necessary to provide sealing means between the moving panel and the frame in which it slides. Such requirement for sealing causes the prior art panel structures to require relatively large effort to move the sliding door because of the high friction caused by the sealing means and, in turn, such high friction in the sealing means causes it to wear out relatively rapidly. Furthermore, if low-friction, long-wearing sealing means were employed, the resulting prior art structures sacrificed the tight seal which should be achieved between the moving door and its frame when the panel is in its closed position. Also, the moving panel normally had to be specifically designed for the specific frame to which it would be set or else the panel would be subject to rattling where its frame was too large. Thus, the moving panel could not be adjusted to various frame sizes.

Still another defect of the prior art panel structures is that when they were subjected to weather, such as wind and rain, they normally required front weep slots in their bottom to drain away the water which penetrated around the sides of the panel. However, such weep slots in effect promoted the leakage of water underneath the panel. Thus, the prior art panel structures were unable to prevent the leakage of windblown water underneath them.

Still another defect of the prior art panel structure involves the use of bottom rollers on moving panels. Such bottom rollers in the prior art panel structures invariably were required to be located at the ends of the panel so that poor load carrying characteristics were exhibited with respect to heavy panels. Furthermore, such bottom rollers made the assembly of the moving panel into its frame difficult and forced the use of special tools therefor.

Still another defect of the prior art was that slidable glass door structures which included also a fixed glass panel and a slidable screen door normally required different, specific outer frames to accommodate the various possible arrangements of the glass door, screen door and glass panel.

In view of the foregoing state of the prior art, one of the objects of the present invention is an easily assembled panel structure which may be formed and installed with a minimum of labor and without requiring special tools.

Another object of the present invention is a panel structure including a frame having a joint connector between the frame rail and stile adapted to simultaneously hold the rail and stile together and maintain frictional engagement therewith while permitting attachment anywhere along the length of either rail or stile and requiring access from only one surface.

Still another object of the present invention is a joint connector for a frame between its rail and stile adapted to hold said rail and stile together and maintain frictional engagement therewith while permitting attachment anywhere along the length of either rail or stile and requiring access from only one surface.

Still another object of the present invention is a frame having a corner joint wherein the stile is spaced from the outer surface of the rail so that a cover assembly may be used to maintain a closed surface flush with the rail surface.

Still another object of the present invention is an easily assembled panel structure, including a seal actuating means adapted to permit low friction movement of an inner movable frame in an outer fixed frame and reduce the wear on the sealing means between said frame and creating a tight seal between said frames when the inner frame is positioned adjacent the outer frame jamb.

Still another object of the present invention is a seal actuating means for a movable frame slidably mounted in a fixed outer frame which can be adjusted to the width of the outer frame and eliminate rattling.

Another object of the present invention is a panel structure which has a fixed outer frame adapted to eliminate front weep slots and to promote the drainage of the water therefrom.

Still another object of the present invention is a panel structure having a movable inner frame mounted in a fixed outer frame, including sealing means adapted to positively prevent the passage of water underneath the movable frame.

Still another object of the present invention is a panel structure, including a movable frame with a bottom roller assembly adapted to be adjusted anywhere along the length of the bottom of said frame.

Still another object of the present invention is a bottom roller assembly adapted to be mounted on a movable frame anywhere along the bottom of said movable frame.

Still another object of the present invention is a panel structure which includes a first and second movable frame and a fixed frame mounted in an outer fixed frame and which outer frame is adapted to permit complete reversibility from inside to outside of the movable frames or the fixed frame.

Other objects and advantages of the present invention will be readily apparent from the following description and drawings which illustrate a preferred exemplary embodiment of the present invention, as well as alternative embodiments of the present invention.

In general, the present invention involves an easily assembled panel structure and portions thereof which may include a fixed outer frame and a movable inner frame. Such portions include means for holding the portions of the frame together by frictional engagement and being adapted to permit attachment anywhere along the length of the portion and to require access from only one surface. The structure may also include means for tightly sealing said frames together where the inner frame joins one of the outer frame jambs while permitting low friction movement of the inner frame. Still another portion of the present invention is a means for draining water from said outer frame while eliminating front weep slots and absolutely preventing passage of water underneath the movable frame. Another portion of the present invention involves means for supporting the inner frame on rollers while permitting the rollers to be adjusted anywhere along the length of the bottom of said frame. Still another portion of the present invention involves a fixed outer frame which permits complete reversibility of the movable inner frames and a fixed inner frame.

In order to facilitate understanding the present invention, reference will now be made to the appended drawings of a preferred specific embodiment of the present invention. Such drawings should not be construed as limiting the invention which is properly set forth in the appended claims.

In the drawings:

FIG. 2 is a cross-sectional view of FIG. 1 taken along the lines 2—2 of FIG. 1.

FIG. 3 is a cross-sectional view of FIG. 1 taken along the line 3—3 of FIG. 1.

FIG. 4 is an enlarged plan view of a portion of the sill of the outer frame showing a phantom view of the bottom roller of the second movable inner frame.

FIG. 5 is an enlarged bottom plan view of a portion of the header of the fixed outer frame of FIG. 1.

FIG. 7 is a cross-sectional view of FIG. 6 taken along the line 7—7 of FIG. 6.

FIG. 8 is a cross-sectional view of FIG. 6 taken along the line 8—8 of FIG. 6.

FIG. 9 is a perspective view of a portion of FIG. 4.

FIG. 10 is a front elevational, cross-sectional view of the bottom roller assembly portion of FIG. 6.

FIG. 11 is similar to FIG. 10, except that an alternate embodiment of the bottom roller assembly is illustrated.

FIG. 12 is a view of FIG. 8 taken along the line 12—12 of FIG. 8.

FIG. 13 is a perspective view of the portion of the drain adjacent the end of the fixed outer frame.

FIG. 14 is an exploded, perspective view of the joint connector of the present invention.

FIG. 15 is an exploded perspective view of the combined bottom roller assembly and joint connector of the present invention.

FIG. 16 is a cross-sectional side view of a panel structure illustrated in FIG. 1, except that the moving frame and fixed frame positions are reversed.

FIG. 17 is a cross-sectional side view of the corresponding bottom portion of the fixed outer frame illustrated in FIG. 16.

FIG. 18 is a cross-sectional side view of another embodiment of the panel structure of the present invention.

Figure 1:
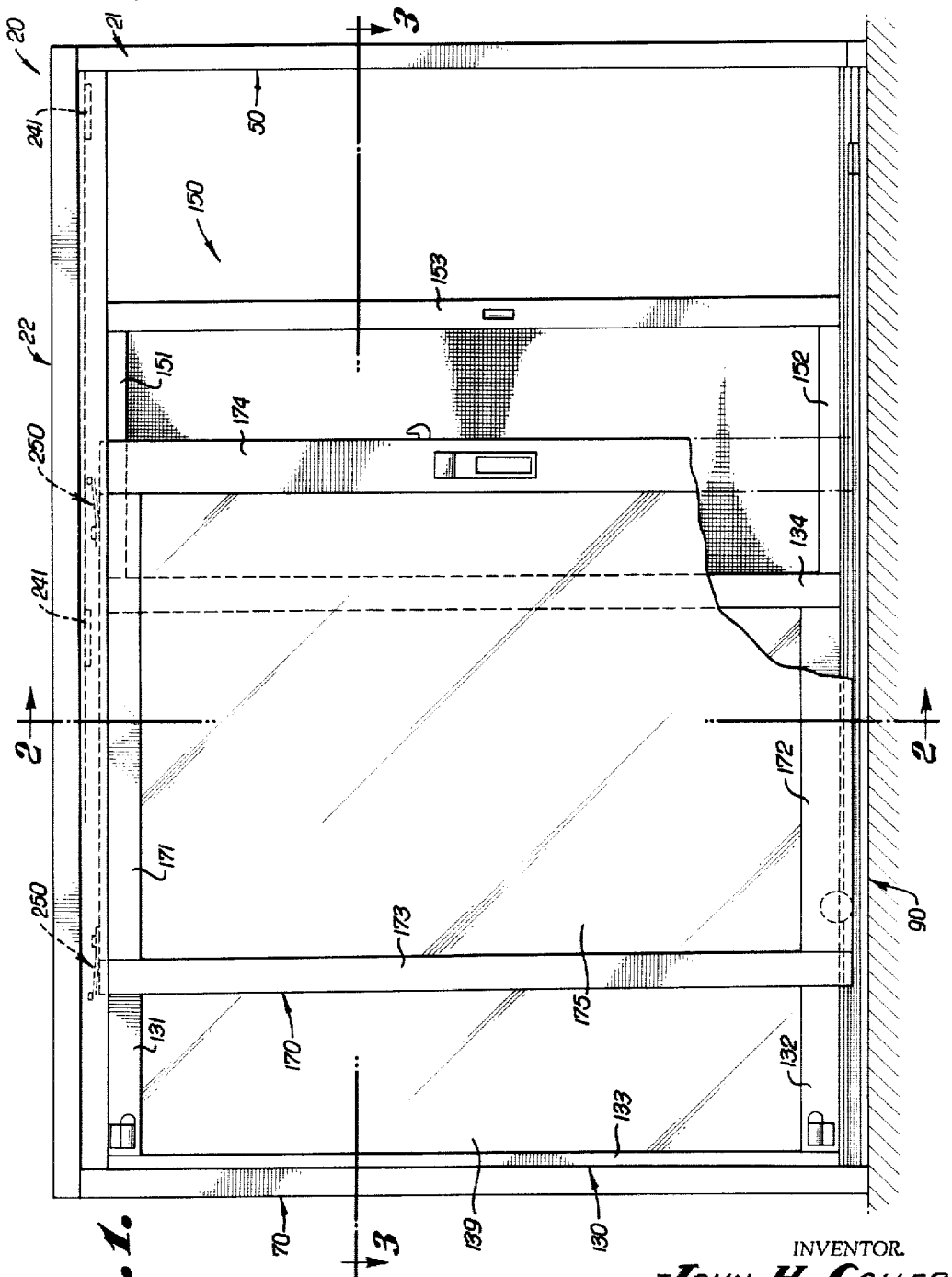
FIG. 1 is a front elevational view of a specific embodiment of the present invention involving a fixed inner frame in the form of a fixed glass window, a first movable inner frame in the form of a sliding screen door, and a second movable inner frame in the form of a sliding glass door. All of said frames are mounted in a fixed outer frame.

As illustrated in FIGS. 1–18, the panel structure 20 of the present invention includes a fixed outer frame 21, a fixed inner frame 130 in the form of a glass window, a first movable inner frame 150 in the form of a screen door, and a second movable inner frame 170 in the form of a glass door.

*Fixed outer frame (FIGS. 1–3, 16–18)*

The fixed outer frame 21 includes a header 22, a first jamb 50, a second jamb 70, and a sill 90. The header 22 includes a header support bar 23 on which is mounted a header track bar 24. The header track bar 24 includes a pair of dependent screen door flanges 25 and 26 which are adapted to form a screen door channel 27 in which the first movable inner frame 150 is slidably mounted. Adjacent the inner screen flange 26 is mounted the reversible header bar 28. The reversible header bar 28 includes a substantially central web 29 from which extends upwardly an angle flange 30 and an L-flange 31. The angle flange 30 has a bead 32 formed on its free end which is mounted in the groove 33 in the base of the screen flange 26. The L-flange 31 has its free leg 34 slidably mounted in a first slot 35 formed in the horizontal central web 36 of the header track bar 24. The support leg 37 of the L-flange 31 forms one side wall of the glass door channel 38 in which the second movable inner frame is slidably mounted in the form of a sliding glass door. The other wall of the glass door channel 38 is formed by a dependent glass door flange 39.

As illustrated in FIG. 2, the glass door channel 38 is separated from the screen door channel 27 by the fixed inner frame 130. However, at the base of the glass door flange 39 is a groove 40 and the central web 36 of the header track bar 24 has a second slot 41 which faces and is identical to the first header track bar slot 35. Consequently, the reversible header bar 28 may be turned around so that the glass door channel 38 adjoins the screen door channel 27, as illustrated in FIG. 17. In such reversed position, the screen door flange 26 becomes also the glass door flange and is equivalent to the glass door flange 39. In addition, the bead 32 of the angle flange 30 is slidably received in the groove 40 of the glass door flange 39 and the free leg 34 of the L-flange 31 is slidably received in the second slot 41 of the track bar web 36.

The first jamb 50 of the fixed outer frame 21 includes a vertical, central web 51 from which screen door flanges 52 and 53 extend inwardly to form a screen door channel 54 in which the first movable inner frame 150 is slidably received. Adjacent the screen door flange 53 is mounted the reversible jamb bar 55 having a vertical central web 56. Extending outwardly from the reversible jamb bar web 56 is an angle flange 57 having a corner 58 which is received in a groove 59 at the base of the screen door flange 53. Also extending outwardly from the reversible jamb bar web 56 is an L-flange 60 having a free leg 61 which is received in a slot 62 in the central web 51 of the first jamb 50. The support leg 63 forms one side wall of the glass door channel 64. The other side wall of the glass door channel 64 is formed by a glass door flange 65 which extends inwardly from the central web 51 of the first jamb 50.

As illustrated in FIG. 3, the glass door channel 64 is separated from the screen door channel 54 by the fixed inner frame 130. However, the glass door flange 65 has a groove 66 in its base and the slot 62 in the central web 51 of the first jamb 50 is adapted to receive the free leg 61 in a reversed position. Consequently, the reversible jamb bar 55 may be turned around so that the corner 58 of the angle flange 57 is received in the groove 66, as illustrated in FIG. 16. With such arrangement, the glass door channel adjoins the screen door channel 54. Both the header 22 and the first jamb 50 have reversible bars 28 and 55, respectively, so that the same construction may be utilized to position the sliding glass door adjacent the sliding screen door or spaced from the sliding screen door.

The second jamb 70 of the fixed outer frame 21 is spaced at the opposite end of the fixed outer frame 21 from the first jamb 50, as in the standard door frame. Similar to the first jamb 50, the second jamb 70 has a vertical, central web 71 with inwardly extending screen door flanges 72 and 73 which form a screen door channel 74. The central web 71 of the second jamb 70 has a reversible jamb bar 75 which has a vertical central web 76 and outwardly extending flanges 77 and 78. The ends of the flanges 77 and 78 are received in a slot 79 in the central web 71 of the second jamb 70. The flange 78 of the reversible jamb bar 75 forms one side wall of the glass channel 80. The other side wall of the glass channel 80 is formed by the glass door flange 81 which extends inwardly from the central web 71 of the second jamb 70. As illustrated in FIG. 3, the glass door channel 80 is separated from the screen door channel 74 by the fixed inner frame 130. However, similar to the first jamb 50, the reversible jamb bar 75 of the second jamb 70 may be turned around so that the glass door channel 80 adjoins the screen door channel 74.

The sill 90 of the fixed outer frame 21 includes a web 91 extending between the first jamb 50 and the second jamb 70. The web 91 has a central longitudinal trough 92 with a drainboard 93 extending inwardly and upwardly therefrom. Extending longitudinally in the outer portion of the web 91 is a channel 94 in which is set the glass door track 95. Attached to the inner side of the sill web 91 is the screen door track bar 96. Extending longitudinally and upwardly from the track bar 96 is the screen door track 97. As illustrated in FIG. 2, the web 91 of the sill 90 has a longitudinal, upwardly extending screen door flange 98 and glass door flange 99.

The sill 90 includes a longitudinal drain 100 which is comprised of the trough 92, the drainboard 93, the screen door flange 98 and the glass door flange 99. The drain 100 extends longitudinally along the bottom surface of the sill 90 and is open along its length only to the interior portion of the sill 90. Connecting at least one end of the drain 100 to the exterior of the fixed outer frame 21 is an outlet conduit means 101, shown in FIG. 13. The outlet conduit means 101 includes a first tube 102 which connects it to the trough 92 of the drain 100. The first tube 102 leads into the slot 62 of the central web 51 of the first jamb 50. Coming out of the slot 62 at right angles to the first tube 102 is a second tube 103 which has an open end 104 connecting the tube 103 to the exterior of the fixed outer frame 21. Covering the open end 104 of the second tube 103 of the outlet conduit means 101 is a cap 105. The cap 105 has opposed open ends 106 and is adapted to promote the flow of air perpendicular to the open end 104 and prevent water from being blown thereinto. Thus, as illustrated in FIGS. 12 and 13, the flow of air can take place only perpendicular to the tube opening because of the cap 105. Furthermore, due to the right angle between the first tube 102 and second tube 103 and the downward inclination of the outlet conduit means 101, it is substantially impossible for windblown water to penetrate into the sill 90.

In FIG. 18, a modified form of the sill 90 is illustrated wherein the second movable inner frame 170 co-acts therewith to positively prevent the passage of water underneath it. In FIG. 18, the sill 110 includes a horizontal central web 111 having a longitudinally extending trough 112 therein. Connected to the horizontal central web 111 is a track bar 113 having a screen door track 114 mounted thereon. Extending longitudinally and upwardly from the central web 111 is a screen door flange 115 and a glass door flange 116. Mounted on the central web 111 of the sill 110 between the screen door flange 115 and glass door flange 116 is a longitudinally extending glass door track 117. The glass door flange 116 is spaced from the glass door track 117 to form a longitudinal aperture 118 which opens into the drain 119. Drain 119 is substantially formed by the trough 112, the screen door flange 115, the glass door flange 116 and the glass door track 117. The aperture 118 is substantially closed by mating flexible lips 120 which are mounted on the wall of the aperture 118 and extend outwardly therefrom to overlap each other. Extending into the sill aperture 118 past the aperture lips 120 is a longitudinal fin 121 which is mounted on the bottom rail 172 of the second movable frame 170. As can be seen from FIG. 18, the combination of the lips 120 and the fin 121 insures that any windblown water which enters the aperture 118 would fall down into the trough 112, since further inward movement would reuqire such water to move upwardly on the inner side of the fin 121.

*Fixed inner frame (FIGS. 1–3)*

As illustrated, the embodiment of the present invention includes a fixed inner frame 130, such as a fixed glass window. The fixed inner frame 130 includes a top rail 131 which is connected to the reversible header bar 28 of the fixed outer frame 21 and a bottom rail 132 which is connected to the sill 90 of the outer frame 21. Extending between the top rail 131 and the bottom rail 132 is a fixed stile 133 which is positioned adjacent the second jamb 70 of the outer frame 21. The other ends of the top rail 131 and bottom rail 132 are connected by a fixed interlocking stile 134 having an L-shaped flange 135 extending outwardly therefrom and adapted to interlock with the moving interlocking stile of the sliding glass door 170. The support leg 136 and the free leg 137 of the L-shaped flange 135 form a recess 138 into which the movable panel is received, as set forth below. Finally, it should be noted that the fixed inner frame 130 includes a sheet of glass 139 set therein.

*First movable inner frame (FIGS. 1–3)*

In addition to the fixed inner frame 130, such as a glass window, the panel structure of the present invention has a first movable inner frame 150, such as a screen door. The first movable inner frame or screen door 150 includes a top rail 151, a bottom rail 152, a first stile 153, and a second stile 154. The bottom rail 152 of the screen door 150 has a longitudinally-extending, downwardly-facing channel 155 in which are mounted screen rollers 156 which are engaged with the track bar 96 and adapted to permit the screen door 150 to slide between the first jamb 50 and the second jamb 70 of the fixed outer frame 21. In addition, the rails 151 and 152 and the stiles 153 and 154 each have an outwardly extending channel 157 in which a gasket 158 is set. The gasket 158 is adapted to retain the screen 159 in its position stretched across the space defined by the screen door frame 150.

*Second movable inner frame (FIGS. 1–3, 6–8, 10, 14 and 15)*

Most important, the present invention has a second movable inner frame or sliding glass door 170. The sliding glass door 170 includes a top rail 171, a bottom rail 172, a moving interlocking stile 173, and a lead stile 174. A sheet of glass 175 is set in the frame 170.

The top rail 171 has a longitudinal channel 176 therein with the side walls 177 having opposed longitudinal ribs 178. The ribs 178 have a substantially L-shaped cross-section with a free leg 179 extending toward the bottom wall 180 of the channel 176. Similarly, the lead stile 174 has a longitudinal channel 185 therein with the side wall 186 having opposed longitudinal ribs 187. As in the case of the top rail 171, the ribs 187 have a substantially L-shaped cross-section with the free legs 188 extending toward the bottom wall 189 of the channel 185.

As illustrated primarily in FIGS. 2 and 3, the top rail 171 and the lead stile 174 are joined together so that one of their channels faces towards said joint and the other of said channels faces away from said joint. More specifically, as shown in FIGS. 2 and 3, the stile channel 185 faces toward said joint and the top rail channel 176 faces away from said joint. As illustrated, the top rail 171 and the lead stile 174 are adapted to be formed continuously and to be simply cut to the desired length without further end working, such as the formation of holes and notches therein.

*Joint connector (FIGS. 2, 6, 7 and 14)*

Holding the top rail 171 and lead stile 174 together is a joint connector 200. The joint connector 200 is adapted to simultaneously hold said rail and stile together and maintain frictional engagement therewith while permitting attachment anywhere along the length of either rail or stile. Furthermore, the joint connector 200 requires access from only one surface in order to secure it in place. As shown, the joint connector 200 includes an outer grip 201 slidably mounted in the channel 176 of the top rail 171 adjacent the opening of the channel 176. Slidably mounted in the channel 176 and the top rail 171 on the opposite side of the channel ribs 178 from the outer grip block 201 is an inner grip block 202. In the channel 185 of the lead stile 174 is slidably mounted a grip key 203 on the side of the channel ribs 187 remote from the joint 190 between the top rail 171 and the lead stile 174. Finally, the joint connector 200 includes a means 204 for clamping the inner and outer grip blocks 201 and 202 and the grip key 203 together.

The outer grip block 201 has longitudinal flanges 205 which are slidably received in grooves 206 of the side walls 177 of the top rail panel 176 so that the outer grip block 201 may be slidably mounted in the top rail 171. Similarly, the inner grip block 202 has slots 207 therein which are adapted to receive the free legs 179 of the top rail ribs 178. Also, the grip key 203 has ridges 217 which are slidably received in the L-shaped rib 187 of the lead stile 174. The grip blocks 201 and 202 and grip key 203 each have teeth 208 which are adapted to prevent their sliding by frictional engagement with the adjoining rib. Also, the grip kep 203 has a tongue 209 extending into the top rail channel 176 and received in the pocket 210 of the inner grip block 202. Such tongue and pocket assembly is adapted to clamp the inner grip block 202 to its adjoining rib 178 when the outer grip block 201 is clamped to the grip key 203. Thus, since the clamping together of the outer grip block 201 and grip key 203 causes them to securely grip their adjoining ribs 178 and 187, respectively, the tongue and pocket assembly permits the joint connector to be clamped together solely by means connecting the outer grip block 201 and rib key 203.

The means 204 for clamping the inner and outer grip blocks 202 and 201, respectively, and grip keys 203 together, as illustrated, includes a first screw means 211 consisting of a bolt 212 and a nut 213 for clamping the outer grip block 201 and inner grip block 202 together on the top rail rib 178. The clamping means 204 also includes a second screw means 214 consisting of a bolt 215 threaded into a hole 216 in the grip key 203. The second screw means 214 is adapted to clamp the grip block assembly to the grip key 203. Preferably, the axis of the second screw means 214 is set at an acute angle to the top rail 171 and lead stile 174 in order to promote the clamping action of the aforementioned tongue and pocket assembly.

From the foregoing description, it can be seen that the joint 190 between the top rail 171 and the lead stile 174 can be made anywhere along the length of the lead stile 174 simply by loosening the joint connector 200 and sliding the top rail 171 downward. On the other hand, if the positions of the top rail 171 and the lead stile 174 were reversed, then it would be possible to permit attachment anywhere along the length of such new top rail, i.e., the former stile 174. In addition, it can be seen that the heads of the bolts 212 and 215 are both accessible from the top surface of the top rail 171. Thus, the lead stile 174 may present a smooth surface and the joint 190 between the top rail 171 and the lead stile 174 is completely hidden. Further, it should be noted that although only the joint between the top rail and lead stile has been described in detail, it is obvious that a similar joint connection can be and is utilized for the other joints in the glass door frame 170, i.e., the joints between the top rail 171 and moving interlocking stile 173, and the joints between the bottom rail 172 and the lead stile 174 and the moving interlocking stile 173.

*Seal actuating means (FIGS. 2, 4–7 and 9)*

The above-described panel structure 20 includes a plurality of sealing means for the various joints therein. Thus, the sheet of glass 139 in the glass panel 130 has a gasket 220 surrounding it and the sheet of glass 175 in the sliding glass door 170 has a gasket 221 surrounding it. The fixed inner frame glass panel 130 has a sealing strip 222 in its bottom rail 132 pressed against an inner sealing strip 223 in the glass door flange 99. The second stile 133 has a sealing strip 224 which is pressed against the screen door flange 73 of the second jamb 70. Also, when the sliding glass door 170 is in its closed position adjacent the first jamb 50 of the outer frame 21, the moving interlocking stile 173 has an L-shaped flange 191 with a support leg 192 and a free leg 193. The free leg 193 is received in the recess 138 of the fixed interlocking stile 134 of the glass panel 130. The free leg 193 has a sealing strip 225a which presses against a sealing strip 225 mounted on the free leg 137 of the L-shaped flange 135. In addition, the free leg 193 has a sealing strip 226 which presses against the fixed interlocking stile 134 of the glass panel 130. Also, the flange 77 of the second jamb 70 has a sealing strip 227 which presses against the fixed stile 133 of the glass panel 130.

Such previously described sealing means are relatively easy to form and maintain, since there is no relative movement between each sealing strip and the sealing surface with which it is in contact. However, the glass door flange 99 has an outer sealing strip 233, the support leg 37 of the header 22 has a sealing strip 228, the free leg 137 of the fixed interlocking stile 134 has an outer sealing strip 229, and the support leg 63 of the first jamb 50 has a sealing strip 230, each of which adjoin the sliding glass door 170. With reference to the sealing strips 233 and 228, the adjoining sealing surfaces are sealing strips 231 and 232 on the inner surfaces of the bottom rail 172 and top rail 171, respectively, of the sliding glass door 170. On the other hand, the adjoining surfaces for the outer sealing strip 229 and the sealing strip 230 are the inner surfaces of the moving interlocking stile 173 and lead stile 174, respectively, of the movable glass door 170.

In any event, where there are such sealing strips adjoining a sealing surface and there is relative movement therebetween, the present invention includes seal-actuating means 240 which is adapted to permit low friction movement of the sliding glass door 170 and reduces the wear of said sealing strips during its movement and yet creates a tight seal between said sealing strips and surfaces when the sliding glass door 170 is positioned adjacent one of the outer frame jambs 50 or 70. The seal actuating means 240 comprises header blocks 241 in the outer frame glass door channel 38 adjacent the outer frame jambs 50 and 70. The header block 241, illustrated in FIGS. 2, 5 and 6, has a cam groove 242 therein with an open end 243 in the central portion of the header channel 38 remote from first jamb 50 and the seal being formed. Adjoining the open end 243 of the cam groove 242 are cam surfaces 244 which are adapted to guide the arm cap 253 into the cam groove 242. Furthermore, the header channel 38 has a longitudinal groove 245 in its bottom surface in which the arm cap 253 normally rides.

Mounted on the top of the glass door top rail 171 is a seal assembly 250 which includes a first plate 251 pivotally mounted on the top rail 171. Extending from the first plate 251 upwardly and toward the first jamb 50 is an arm 252 having a cap 253 on its end adapted to be received in the header block cam groove 242. Also mounted on the first plate 251 is a first top roller 254 in contact with the glass door flange 39, i.e., the header channel 38 side wall remote from the seal being formed.

Pivotally mounted on the first plate 251 is a second plate 255 with said first top roller 254 being mounted thereon. The first plate 251 also has a second top roller 256 adapted to contact the header channel side wall adjacent the seal being formed and to be moved away from the first top roller 254 by the movement of the second plate 255 with respect to the first plate 251. The first plate 251 also has a series of teeth 257 formed therein. Mounted on the second plate 255 is a lug 258 which is adapted to be engaged with said teeth 257. The engagement of the lug 258 with the teeth 257 is adapted to determine the space between the first and second top rollers 254 and 256 and to insure a snug fit between the rollers and the header channel 38. Thus, when the header channel 38 varies in width, the seal assembly 250 may be adjusted accordingly. The seal assembly 250 also includes a slot 259 in the second plate 255 and a screw means 260 extending through the slot 259 and mounted on the first plate 251. The slot 259 and the screw means 260 are adapted to clamp the plates 251 and 255 together.

The seal actuating means 240 also include a cam track 261 positioned at the end of the glass door track 95 on the sill 90 adjacent the first jamb 50. The cam track 261 has a boss 262 which is adapted to be engaged in the glass door track 95 to connect the cam track 261 thereto. When the sliding glass door 170 approaches the first jamb 50 (see phantom views in FIGS. 7 and 8), two events simultaneously take place. The first event comprises the engagement of the arm cap 253 in the cam groove 242 and its sliding therein towards the seal being formed. Such movement of the cap 253 in turn causes the first top roller 254 to press against the glass door flange 39. Since the glass door flange 39 is a portion of the outer fixed flange 21, such pressure of the roller 254 displaces the top rail 171 of the sliding glass door 170 towards the seal being formed. The second event which occurs is the rolling of the bottom roller 291 onto the cam track 261. Such movement causes the bottom rail 172 of the sliding glass door 170 to also move towards the seal being formed. Consequently, the sliding glass door 170 as a whole moves toward the sealing strips 227, 228, 229 and 230 to form a tight seal therewith. Conversely, when the sliding glass door 170 is moved away from the first jamb 50, the reverse action takes place so that no friction movement is permitted during the major portion of the travel of the sliding glass door and there is reduced wear on the sealing strips. It should be noted that various other arrangements of parts can obviously be made in the sealing means and seal actuating means and still achieve substantially the same effect. Thus, for example, the first roller could be mounted on the first plate and the second roller mounted on the second plate in the seal assembly. Similarly, the movement of the sliding glass door may be outwardly instead of inwardly, as set forth above, by appropriate changes in the seal actuating means.

*Bottom roller assembly (FIGS. 2, 6, 10, 11 and 15)*

The bottom rail 172 of the sliding glass door 170 has a downwardly faced longitudinal channel 194 therein with the side walls 196 having opposed longitudinal ribs 197. Mounted in the bottom rail channel 195 is a bottom roller assembly 270. The bottom roller assembly 270 comprises a housing 271 slidably mounted in the channel 195 and having longitudinal flanges 272 adjoining the surfaces of the ribs 197 adjacent the channel opening. Slidably mounted in the channel 195 on the opposite side of the channel ribs 197 from the housing flanges 272 is a housing grip block 273. Clamping means 274 hold the housing flanges 272 and housing grip block 273 together. The clamping means 274, as illustrated, includes a first bolt 275 and a nut 276 which are adapted to force the teeth 277 of the flanges 272 and the housing grip block 273 into frictional engagement with the ribs 197 of the channel 195.

In the housing 271 is a bottom roller bracket means 290 having a bottom roller 291 mounted thereon which is adapted to extend beyond the bottom surface of the bottom rail 172 into engagement with the glass door track 95. The bottom roller bracket means 290 comprises a yoke 292 pivoted on a pin 293 in the housing 271, with the bottom roller 291 mounted between the arms 234 of said yoke. Connecting said yoke 292 and the housing 271 is an adjusting means 295 adapted to selectively position the bottom roller 291 in the housing 271. The adjusting means 295 comprises a bar 296 connected between the arms 294 of the yoke 292 and having a transverse threaded hole 297 therein. Threaded into the hole 297 is an axle 298 which extends through an aperture 299 in the housing 271 and has a wheel 300 connected thereto. The bracket means 290 also includes a spring means 301 which is adapted to bias the bottom roller 291 into the housing 271. As shown in FIG. 10, the spring means 301 consists of a leaf spring 302 bent around the pivot pin 293 and seated against the housing end wall 303 and the plate 304 in the yoke 292.

Figure 6:
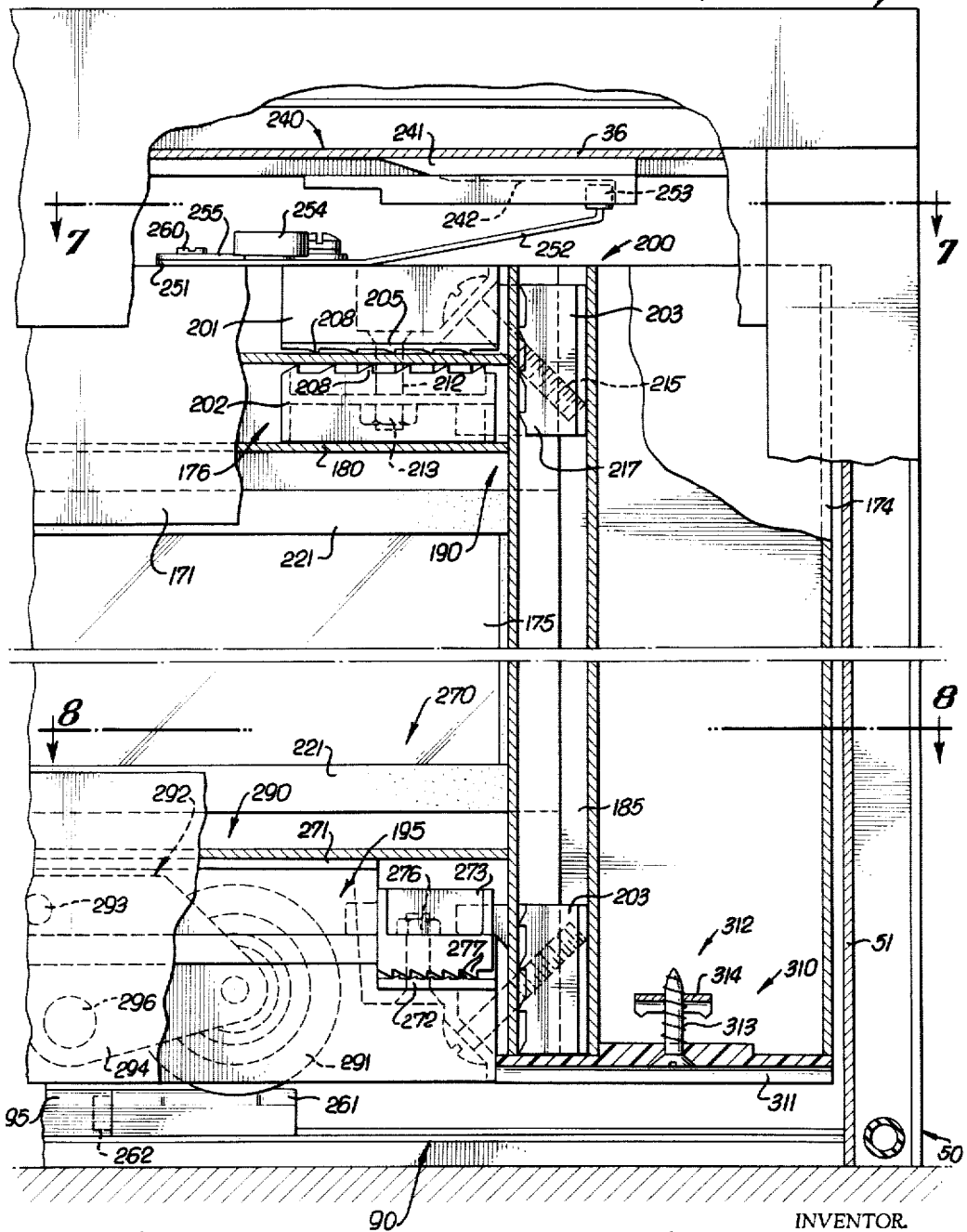
FIG. 6 is an enlarged, partially broken-away, cross-sectional elevational view of FIG. 1 showing the second movable inner frame adjacent the jamb of the fixed outer frame.

As illustrated in FIG. 11, the adjusting means 295 is adapted to simultaneously position two adjacent bottom rollers 291, since the axle 298 is threaded on both ends and the orientation of the bottom roller bracket means 290 permits the bars 296 to be positioned adjacent each other. As illustrated in FIGS. 6, 10 and 15, particularly, the housing 271 and housing grip block assembly 273 is adapted to be clamped to a grip key 203 slidably mounted in the longitudinal channel 185 of the lead stile 174. Similar to the joint connector 200, the grip key 203 has ridges 217 adapted to contact the ribs 187 and a tongue 209 adapted to be received in a pocket 210 in the housing grip block 273. Also, similar to the joint connector 200, a second screw means 214, including a second bolt 215 threaded into a hole 216 in the grip key 203 is adapted to clamp the grip key 203 to the housing and housing grip block assembly.

*Cover assembly (FIGS. 6 and 8)*

When it is desired to cover the end of the stile, such end may be spaced from the rail surface, as illustrated in FIG. 6. Such space may then be occupied by a cover assembly 310 which is adapted to maintain a closed surface flush with the surface of the bottom rail 172. The cover assembly 310 includes a cover 311 mounted over the end of the front lead stile 174 flush with the surface of the bottom rail 172. Attaching means 312 connects the cover 311 to the stile 174. The attaching means 312 comprises a screw means 313 threaded into a clip 314 which is mounted within the lead stile 174.

*Installation of panel structure*

After the fixed outer frame 21 has been installed in the conventional way, the fixed inner frame 130 and the first movable inner frame 150 may be installed in a similar conventional manner. However, the second movable inner frame 170 need merely be lifted and slipped into the glass door channel 38 at the top and over the glass door track 95 at the bottom. Such installation is easy because it is immaterial where the arm cap 253 is seated in the channel 38, since on the initial closing of the door the cam surfaces 244 move the cap into the cam groove 242 and thereafter the cap 253 rides in the header groove 245. Similarly, the spring means 301 keep the bottom rollers 291 retracted within the housing during installation. Then, after installation, the bottom rollers 291 may be moved down into engagement with the glass door track 95 by rotation of the wheel 300.

Many other specific embodiments of the present invention will be obvious to one skilled in the art in view of this disclosure. For example, the number of such variations have already been set forth in the course of this specification. In addition, it should be noted that the tongue in pocket arrangement may be eliminated from the joint connector of the present invention and the various L-shaped ribs and flanges may be replaced with simple flat ribs and flanges. Furthermore, the clamping means used to hold the joint connector together may utilize a single screw means, if desired, or alternatively, the second screw means may be attached between the inner grip block and the grip key.

There are many features in the present invention which clearly show the significant advance the present invention represents over the prior art. Consequently, only a few of the more outstanding features will be pointed out to illustrate the unexpected and unsual results attained by the present invention. One feature of the present invention is a joint connection which permits frictional engagement between any pair of connected beams at any angle. Furthermore, as illustrated, the rail and stile may be formed continuously and simply cut to desired length without further end work, such as special plant operations involving notching, hole punching and milling. The clamping action involved in the joint connection of the present invention simultaneously holds the rail and stile together and maintains frictional engagement therewith so that such engagement is mutually reinforcing. Also, the attachment of the rail and stile may be anywhere along the length of either and thus permitting an offset at the end. Such offset permits a cover assembly to be attached without causing a bump at the corner. Furthermore, the joint connector requires access from only one hidden surface so that the resulting structure presents a uniform, smooth surface without holes or caps.

Another feature of the present invention is the seal-actuating means which permits low-friction movement of the sliding glass door and reduces wear on the sealing strips. However, combined with these advantages, the glass door still achieves a tight seal in a closed position. Such results are achieved with a simplicity of construction and include means to adjust to the width of the channel and such adjustment. Still another feature of the present invention is a drain structure which is adapted to eliminate front weep slots and to promote drainage of water from the door sill. In addition, the panel structure includes a movable inner frame which is adapted to positively prevent the passage of the water underneath it. Still another feature of the present invention is a bottom roller assembly which is adapted to be adjusted anywhere along the length of the bottom rail and thus compensate for extra heavy door loads. Still another feature of the present invention is a header and jamb construction which permits a variety of relative positions transverse to their longitudinal axles for the various components, such as the glass door, screen door and fixed glass panel, without requiring a different header or stile for each arrangement.

It will be understood that the foregoing description and examples are only illustrative of the present invention and it is not intended that the invention be limited thereto. All substitutions, alterations and modifications of the present invention which come within the scope of the following claims or to which the present invention is readily susceptible without departing from the spirit and scope of this disclosure are considered part of the present invention.

I claim:

1. An easily assembled panel structure, including a movable frame having top and bottom rails and stiles and a bottom roller assembly mounted in said bottom rail and adapted to be adjusted anywhere along the length of said bottom rail, said frame comprising:
   (a) a bottom rail having a lower margin and a downward facing longitudinal channel therein with the side walls of said channel having opposed longitudinal ribs; and
   (b) spaced bottom roller assemblies mounted in said bottom rail channel, each said roller assembly comprising
      (I) a housing mounted in said channel having longitudinal flanges adjoining the surfaces of said ribs adjacent the channel opening,
      (II) a housing grip block mounted in said channel on the opposite side of said channel ribs from said housing flanges,
      (III) means for clamping said housing flange and housing grip block together,
      (IV) a bottom roller bracket means pivotally mounted in said housing and having a bottom roller mounted thereon, and
      (V) adjusting means connected to said bracket means for swinging said bracket means beyond said lower margin of said bottom rail.

2. An easily assembled panel structure, including a movable frame having top and bottom rails and stiles and a bottom roller assembly mounted in said bottom rail, said frame comprising:
   (a) a bottom rail having a downward facing longitudinal channel therein with the side walls of said channel having opposed longitudinal ribs, said channel defining an open end in said rail; and
   (b) spaced bottom roller assemblies mounted in said bottom rail channel, each said roller assembly comprising:
      (I) an open bottomed housing mounted in said channel, said housing including an integral extension forming a first clamping means engageable with said ribs adjacent said open end,
      (II) a housing block clamping said integral extension into clamping engagement with said ribs,
      (III) grip key means clamping one of said stiles, said integral extension and said housing grip block together,
      (IV) a bottom roller means pivotally mounting in said housing and having a bottom roller mounted thereon, and
      (V) adjusting means connected to said bracket means for swinging it out through said open bottom of said housing, whereby said bottom roller may be extended beyond said rail surface.

3. A panel structure as stated in claim 2 wherein said bracket means includes spring means adapted to bias said bottom roller into said housing.

4. A panel structure as stated in claim 2 wherein said adjusting means is connected to a second bracket means having a second bottom roller mounted thereon to simultaneously position said bottom rollers.

5. In combination with a fixed frame having an upper header, a lower sill and a vertical jamb, a sliding panel and roller supporting means, comprising:
   (a) a movable frame reciprocally mounted in said fixed frame, said movable frame having top and bottom rails and vertical, spaced-apart parallel stiles connecting said rails together;
   (b) spaced bottom roller assemblies mounted in said bottom rail for guiding said movable frame as it is reciprocated within said fixed frame, each said bottom roller assembly comprising:
- (I) an open bottom housing mounted in said channel, said housing including an integral extension forming a first clamping means engageable with said bottom rail;
- (II) a housing grip block clamping said integral extension into clamping engagement with said bottom rail;
- (III) grip key means clamping one of said stiles, said integral extension and said housing grip block together;
- (IV) a bottom roller bracket means pivotally mounted in said housing and having a bottom roller mounted thereon; and
- (V) adjusting means connected to said bracket means for swinging said bracket means through said open bottom of said housing, whereby said bottom roller may be extended beyond said bottom rail.

(c) spaced top roller assemblies mounted in said top rail for guiding said movable frame as it is reciprocated within said fixed frame;

(d) first track means mounted on said lower sill in engagement with each said bottom roller assembly, said first track means including an offset portion for directing said movable frame into sealing engagement with said fixed frame when said movable frame is slid to a predetermined position within said fixed frame; and (e) second track means mounted on said upper header in engagement with each said top roller assembly, said second track means including an offset portion for directing said movable frame into sealing engagement with said fixed frame when said movable frame is slid to said predetermined position.

References Cited by the Examiner

UNITED STATES PATENTS

| | | | |
|---|---|---|---|
| 1,861,861 | 6/1932 | Hudson | 20—11 |
| 1,877,977 | 9/1932 | Rowland et al. | 20—11 |
| 2,144,782 | 1/1939 | Swanson | 20—19 |
| 2,733,487 | 2/1956 | Hauck | 20—70 |
| 2,861,659 | 11/1958 | Hagerty et al. | 189—36 |
| 2,931,434 | 4/1960 | Steel | 160—91 |
| 2,950,756 | 8/1960 | Maloney | 160—91 |
| 2,996,159 | 8/1961 | Casebolt | 189—36 |
| 3,040,391 | 6/1962 | Saunders | 20—19 |
| 3,053,353 | 9/1962 | Miller | 189—75 |
| 3,060,524 | 10/1962 | Tucker | 20—19 |
| 3,091,008 | 5/1963 | Riegelman | 20—70 |
| 3,106,754 | 10/1963 | Grossman | 20—69 |

HARRISON R. MOSELEY, *Primary Examiner.*